United States Patent [19]

Graiff et al.

[11] 4,437,436
[45] Mar. 20, 1984

[54] ANTIKNOCK ADDITIVE COMPOSITIONS AND UNLEADED GASOLINE CONTAINING SAME

[75] Inventors: L. B. Graiff, Houston, Tex.; John L. Laity, Modesto, Calif.

[73] Assignee: Shell Oil Company, Houston, Tex.

[21] Appl. No.: 432,587

[22] Filed: Oct. 4, 1982

[51] Int. Cl.$^3$ .............................................. F02B 47/04
[52] U.S. Cl. ...................... 123/1 A; 44/68; 44/78; 252/386; 252/392; 123/198 A
[58] Field of Search ............ 44/68, 78; 252/386, 252/392; 123/1 A, 198 A

[56] References Cited

U.S. PATENT DOCUMENTS

| | | | |
|---|---|---|---|
| 2,449,962 | 9/1948 | Wachter et al. | 252/392 |
| 2,643,176 | 6/1953 | Wachter et al. | 252/392 |
| 2,868,816 | 1/1959 | Petree | 44/68 |
| 2,960,514 | 11/1960 | Brown et al. | 44/68 |
| 4,031,864 | 6/1977 | Crothers | 123/1 A |
| 4,214,615 | 7/1980 | Boyer | 123/1 A |

FOREIGN PATENT DOCUMENTS

| | | | |
|---|---|---|---|
| 707695 | 4/1965 | Canada | 44/68 |
| WO82/00175 | 1/1982 | PCT Int'l Appl. | 123/1 A |

*Primary Examiner*—Charles F. Warren
*Assistant Examiner*—Y. Harris-Smith
*Attorney, Agent, or Firm*—John M. Duncan

[57] ABSTRACT

A method of operating a spark ignition internal combustion engine with unleaded gasoline is disclosed wherein methylcyclopentadienyl manganese tricarbonyl (MMT) is used as a primary antiknock compound and from about 5 to about 60 moles of benzoylacetone or methyl benzoylacetone per mole of manganese is used as a co-antiknock compound. These co-antiknock compounds are particularly suitable because they do not react with wet rusted steel in gasoline distribution systems, nor with terneplate surface coatings in automobile fuel storage tanks.

5 Claims, 3 Drawing Figures

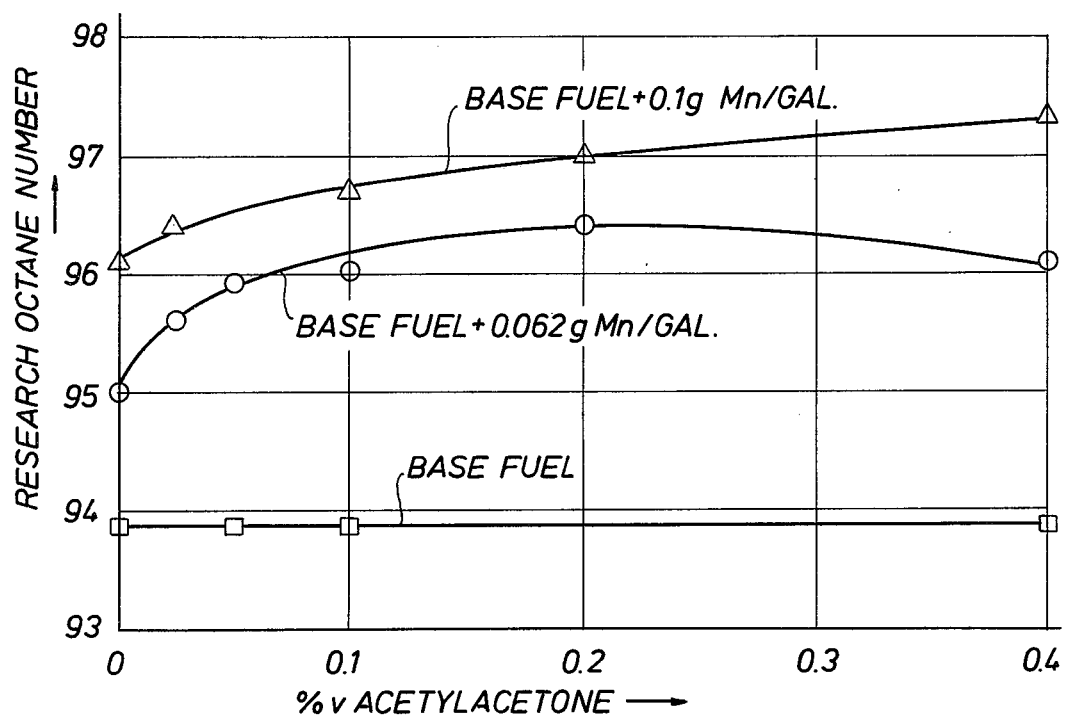
FIG. 1 EFFECT OF AcAc CONCENTRATION ON RESEARCH OCTANE RESPONSE OF A COMMERCIAL UNLEADED GASOLINE CONTAINING MMT (FUEL BLEND A - TABLE 3)
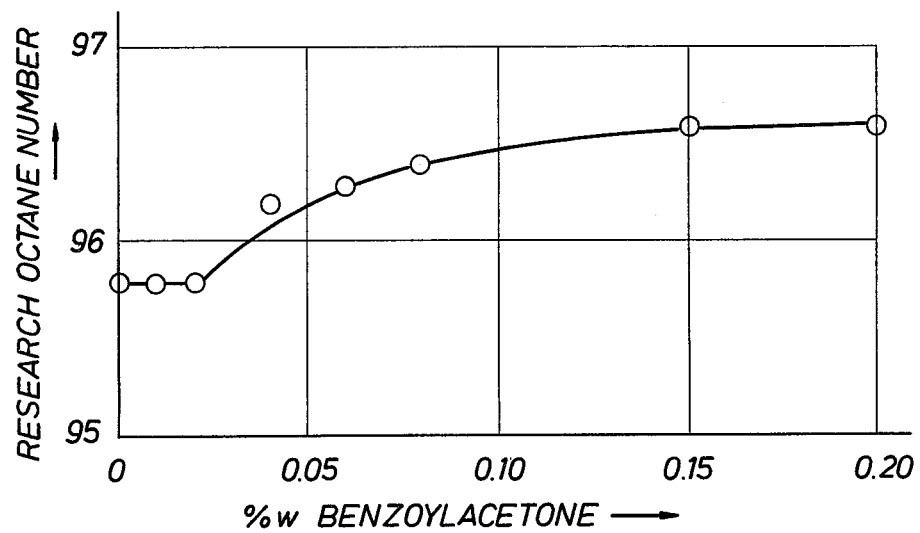
FIG. 3 EFFECT OF BENZOYLACETONE ON RESEARCH OCTANE RESPONSE OF A COMMERCIAL UNLEADED GASOLINE CONTAINING MMT (FUEL BLEND D - TABLE 3)

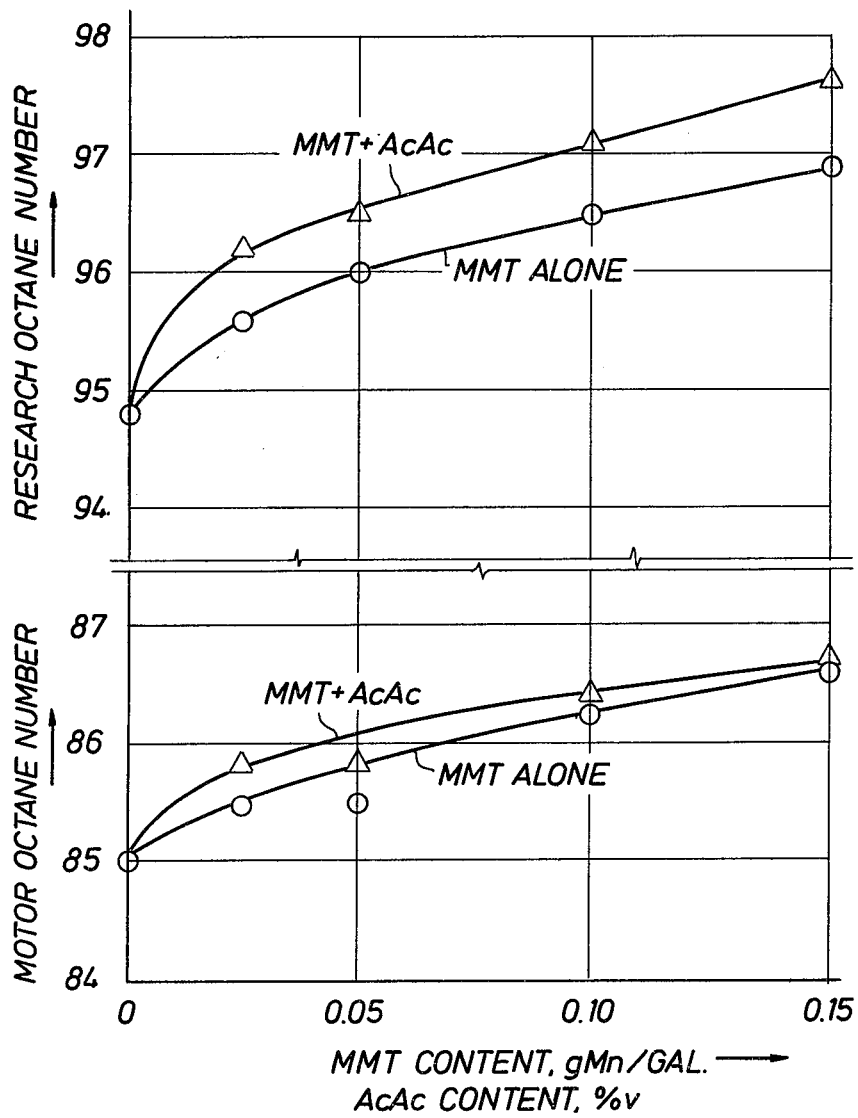
FIG. 2 RESPONSE OF COMMERCIAL UNLEADED TYPE GASOLINE (FUEL BLEND B - TABLE 3) TO MMT AND MMT+AcAc (AcAc/MMT mol RATIO OF 20/1)

ANTIKNOCK ADDITIVE COMPOSITIONS AND UNLEADED GASOLINE CONTAINING SAME

BACKGROUND OF THE INVENTION

This invention relates to an improved method of operating a spark ignition internal combustion engine with unleaded gasoline containing methylcyclopentadienyl manganese tricarbonyl (MMT) as a primary antiknock compound and an effective co-antiknock compound. Specifically, the invention relates to a method of operating said engine with unleaded gasoline containing MMT and a co-antiknock compound which does not react with metals contained in gasoline distribution systems and automobile storage tanks.

MMT, which was developed by Ethyl Corporation, is the only proven antiknock for use in unleaded gasolines. Until recently MMT was widely employed in unleaded commercial fuels. Because of its widespread use, the Environmental Protection Agency specified in January 1977 that ⅛ g Mn/gal as MMT must be used in gasoline by the auto companies to qualify their 1979 models for emission standards. Car manufacturers were concerned about this requirement as it would make it more difficult to meet future exhaust emission standards. Accordingly, it was suggested that the use of MMT in gasoline be limited. A level of ⅛ g Mn/gal can raise hydrocarbon emissions somewhat, making it more difficult to meet the present hydrocarbon emission limit of 0.41 g/mile. In June 1977, Ethyl Corporation recommended that the maximum MMT content of gasoline be limited to 1/16 g Mn/gal instead of ⅛ g/gal, contending that this lower Mn level does not effect "engine out" hydrocarbon emissions (i.e., prior to any exhaust catalyst). In July 1977, the California Air Resources Board banned the use of MMT in California.

In September, 1977 the EPA rescinded the requirement that auto manufacturers use MMT in gasolines used to certify 1979 model cars for emission standards. This action was based on the Clean Air Act amendments of 1977, which banned the use of MMT after Sept. 15, 1978 unless the EPA determined that a specified concentration of the additive does not contribute to the failure of vehicles to meet emission standards. In justifying the changes, the EPA reasoned that there is no need for MMT in qualification gasolines, since the 1979 model cars would operate in the field either on MMT free gasolines or on ones containing no more than a level of MMT that had been determined not to adversely affect emissions. Currently MMT is banned from unleaded gasoline in the United States; however, it is presently used extensively in unleaded fuels in Canada. It is likely that at some future time MMT may again be cleared for use in unleaded gasolines in the United States at up to a concentration of 1/32 g Mn/gal.

Since MMT is limited in any case to low concentrations in gasolines because of potential side-effects (e.g., spark plug fouling, valve burning, higher hydrocarbon emissions, and catalyst plugging), ways of enhancing the activity of MMT are highly desirable. In the late Fifties, it was discovered that some oxygenated organic compounds (e.g., beta-diketones and carboxylic acids), which are not antiknocks in themselves and therefore are referred to as co-antiknocks, were effective in enhancing the octane quality of gasolines containing tetraethyllead (TEL) or MMT. Since there was little interest at that time in metal-organic antiknocks other than TEL, little effort was devoted to finding MMT co-antiknock compounds.

It is known from Canadian Pat. No. 707,695 which is incorporated herein by reference that when certain diketones are added in small amounts to high octane number motor fuels containing, as primary antiknock agents, e.g. tetraethyl lead or the class of manganese compounds disclosed in U.S. Pat. No. 2,818,417, that the octane number of the fuel compositions is unexpectedly increased even further by as much as 2.5 octane numbers, even though in the absence of the primary antiknock agent substantially no octane number benefit is obtained by such additions. Effective diketones are said to be those having the formula:

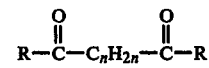

where, n is a whole number from 1 to 2 inclusively. The symbol R denotes a monovalent hydrocarbly radical having from 1 to 10 carbon atoms selected from the group consisting of alkyl, aryl, cycloalkyl, alkylaryl, and arylalkyl. This patent further discloses that when MMT is used as the primary antiknock agent, it is preferred to employ in the concentrate an amount of diketone corresponding to from about 60 to about 110 parts by weight of carbonyl per part of manganese metal, with a preferred ratio of from about 80 to 90.

It is also known from U.S. Pat. No. 3,261,674 that MMT exhibits a precipitate-forming decomposition reaction when gasolines containing same are exposed to sunlight. This reaction can be inhibited by incorporating a beta-diketone in the MMT, thereby enabling retention of the MMT in solution. From 1 to 3 mols of a hydrocabon oil soluble beta-diketone will inhibit 1 mol of MMT antiknock agent against a precipitate-forming decomposition reaction resulting from exposure to radiation such as sunlight. Concentrations greater than 3 moles of beta-diketone inhibitor to one mole of MMT were not recommended since the added inhibition protection is insufficient to warrant the increased cost of using such larger amounts of inhibitor.

An investigation of many of the beta-diketone co-antiknock agents disclosed in the prior art revealed that not all beta-diketones encompassed by the disclosures are effective as co-antiknock agents. Furthermore, it was discovered that most of the beta-diketones reacted with wet rust present in gasoline distribution systems resulting in loss of co-antiknock activity. It was also discovered that many of the beta-diketones reacted with terneplate (90% lead —10% tin alloy) which is used as internal surface coating for vehicle fuel tanks. Accordingly, it is an object of this invention to provide a method of operating a spark ignition internal combustion engine by providing an effective co-antiknock compound for unleaded gasoline containing MMT. Such a compound must not lose its co-antiknock effectiveness in the presence of wet rusted steel contained in gasoline distribution systems or in the presence of terneplate contained in the internal surface coating of automobile fuel tanks.

SUMMARY OF THE INVENTION

According to the invention, there is provided an improved method of operating a spark ingnition internal combustion engine which comprises burning in said engine and unleaded gasoline which has been transported to the engine through a gasoline distribution system which includes rusted steel lines and/or has been stored in an automobile fuel tank which includes a terneplate internal surface coating, said unleaded gasoline containing as a primary antiknock compound from about 0.005 to about 0.1 gram manganese per gallon as methyl cyclopentadienyl manganese tricarbonyl (MMT) and containing as a co-antiknock compound which is generally unreactive with rusted steel or terneplate from 5 to about 60 moles of benzoylacetone or methyl benzoylacetone per mole of manganese and optionally a suitable corrosion inhibitor.

DESCRIPTION OF THE PREFERRED EMBODIMENTS

Applicants have discovered that from the large number of beta-diketones available only two are suitable for use as a co-antiknock compound in unleaded gasolines containing MMT. These two compounds are benzoylacetone and methyl benzoylacetone. All of the others are either not effective as co-antiknocks or are reactive with the wet rusted steel contained in gasoline distribution systems or terneplate which is present as a liner in automobile fuel tanks. This reaction destroys their effectiveness as a co-antiknock compound.

From an octane rating enhancement viewpoint suitable concentrations of MMT in unleaded gasoline range from about 0.005 to about 0.1 gram manganese per gallon. Although current EPA regulations prohibit the use of any MMT in gasoline, it is anticipated that future regulations may permit up ot 1/32, or more, gram manganese per gallon. In that event, the octane rating improvement achieved by adding MMT as a primary antiknock compound to unleaded gasoling can be doubled by adding as a co-antiknock compound either benzoylacetone or methyl benzoylacetone to the gasoline. Although only p-methyl benzoylacetone was tested and found suitable, the ortho and meta compounds are believed to be equally suitable.

It was found that the co-antiknock compounds of the invention are effective in concentrations ranging from about 5 to about 60 moles per mole of manganese present as MMT. Preferably, the concentration of co-antiknock compound will range from about 10 to about 30 moles per mole of manganese (as MMT).

While benzoylacetone in gasoline was found to be unreactive with wet-rusted steel and terneplate in initial tests, long term tests showed that it reacts slowly with wet-rusted steel (but not with terneplate). This reaction can be inhibited by adding from 10 to 200 ppm by weight of a suitable corrosion inhibitor to the gasoline containing benzoylacetone. Such an inhibitor must be hydrocarbon soluble rather than water soluble, since the latter-type inhibitor would be washed from the gasoline during transportation and storage. Dicyclohexyl ammonium nitrite and diisopropanolamine were found to be suitable corrosion inhibitors. Methyl benzoylacetone, while not reactive with either wet-rusted steel or terneplate, is more expensive to produce commercially than benzoylacetone. Thus the use of a combination of benzoylacetone and a suitable corrosion inhibitor may be a more economically attractive method of operating an engine than would the use of benzoylacetone alone as a co-antiknock compound.

The invention will now be illustrated with reference to the following Examples, which are intended to be a complete specific embodiment of the invention and are not intended to be regarded as a limitation thereof.

EXAMPLE I

A series of screening tests was undertaken to find the most effective co-antiknock compounds for MMT. The compounds screened were commercially available samples of the highest purity available; the samples were not, however, analyzed for purity. Some additives which were not readily soluble in the base gasoline were first dissolved in toluene before being added to the base fuel. These additive fuels were rated against the base fuel containing the same amount of added toluene to eliminate any effects of the solvent. Most of the tests were conducted at diketone concentrations of 0.1, 0.2 and 0.5% v in gasoline.

The Research and Motor Method octane number determinations were obtained using the standard ASTM test procedures. For most determinations, direct octane number comparisons were made between the base fuel and the base fuel plus the potential co-antiknock additive by alternately rating the two fuels in the knock engine.

Since at the time the investigation started one-eighth (0.125) of a gram of manganese per gallon (as MMT) was the maximum amount of antiknock recommended, most of the additive screening was conducted with two similar unleaded-type commercial gasolines containing 0.1 g Mn/gal.

A list of diketones screened for co-antiknock effectiveness with MMT, along with their molecular structure, is set out in Table I.

From Table I, it is seen that the alpha- and gamma-diketones (2,3-butanedione and 2,5-hexanedione, respectively) are ineffective as co-antiknocks with MMT, while the beta-diketones, such as 2,4-pentanedione (acetylacetone) and 3,5-heptanedione, are excellent MMT co-antiknock compounds, i.e., the best that were observed in terms of enhancement of both the Research and Motor octane numbers. The higher molecular weight $\beta$-diketones, e.g., 4,6- nonanedione and 2,2,6,6-tetramethyl-3,5-heptanedione, are also excellent co-antiknocks with MMT.

Substitutions of one or two methyl groups on the methylene group between the two carbonyls of a $\beta$-diketone (e.g., acetylacetone) destroys the co-antiknock activity, as evidenced by the results with 3,3- dimethyl-2,4-pentanedione and 3-methyl-2,4-pentanedione. However, substitution of an acetyl group on the methylene (giving triacetylmethane) retains some of the acetyl effectiveness. Octane results with 3,3-dimethyl-2,4-pentanedione strongly suggest that $\beta$-diketones which are non-enolisable are inactive as co-antiknocks. beta-diketones are non-enolisable if the two hydrogen atoms attached to the carbon, which is flanked by the two keto groups, are replaced by alkyl or other groups.

Beta-diketones other than the aliphatic type were also found to be co-antiknocks. Ring-substituted $\beta$-diketones such as benzoylacetone and dibenzoylacetone are effective compounds, with the former being as good as the aliphatic $\beta$-diketones. Steric hindrance from the two phenyl groups on dibenzoylmethane may be the reason for its lower activity. Cyclic $\beta$-diketones where one of the carbonyl groups is located on the ring structure (e.g., 2-acetylcyclohexanone) are not as effective as the aliphatic $\beta$-diketones.

TABLE 1

SCREENING OF DIKETONES FOR MMT CO-ANTIKNOCK ACTIVITY

| DIKETONE | MOLECULAR STRUCTURE | EFFECTIVENESS WITH MMT | REACTS WITH WET RUSTED STEEL | REACTS WITH TERNEPLATE |
|---|---|---|---|---|
| 2,3-Butanedione | $CH_3-\overset{O}{\overset{\|}{C}}-\overset{O}{\overset{\|}{C}}-CH_3$ | Strongly Negative | — | — |
| 2,5-Hexanedione | $CH_3-\overset{O}{\overset{\|}{C}}-CH_2-CH_2-\overset{O}{\overset{\|}{C}}-CH_3$ | None | — | — |
| B-Diketones | | | | |
| 2,4-Pentanedione | $CH_3-\overset{O}{\overset{\|}{C}}-CH_2-\overset{O}{\overset{\|}{C}}-CH_3$ | Excellent | Yes | No |
| 2,4-Hexanedione | $CH_3-\overset{O}{\overset{\|}{C}}-CH_2-\overset{O}{\overset{\|}{C}}-CH_2-CH_3$ | Excellent | Yes | No |
| 2,4-Heptanedione | $CH_3-\overset{O}{\overset{\|}{C}}-CH_2-\overset{O}{\overset{\|}{C}}-CH_2-CH_2-CH_3$ | Excellent | Yes | — |
| 3,5-Heptanedione | $CH_3-CH_2-\overset{O}{\overset{\|}{C}}-CH_2-\overset{O}{\overset{\|}{C}}-CH_2-CH_3$ | Excellent | Yes[a] | No |
| 6-Methyl-2,4-Heptanedione | $CH_3-\overset{O}{\overset{\|}{C}}-CH_2-\overset{O}{\overset{\|}{C}}-CH_2-\overset{CH_3}{\overset{\|}{CH}}-CH_3$ | Excellent | Yes | Yes |
| 2,4-Nonanedione | $CH_3-\overset{O}{\overset{\|}{C}}-CH_2-\overset{O}{\overset{\|}{C}}-CH_2-CH_2-CH_2-CH_2-CH_3$ | Excellent | Yes | — |
| 4,6-Nonanedione | $CH_3-CH_2-CH_2-\overset{O}{\overset{\|}{C}}-CH_2-\overset{O}{\overset{\|}{C}}-CH_2-CH_2-CH_3$ | Excellent | Yes | No |
| 2,2,6,6-Tetramethyl-3,5-Heptanedione | $CH_3-\underset{CH_3}{\overset{H_3C}{\overset{\|}{\underset{\|}{C}}}}-\overset{O}{\overset{\|}{C}}-CH_2-\overset{O}{\overset{\|}{C}}-\underset{CH_3}{\overset{CH_3}{\overset{\|}{\underset{\|}{C}}}}-CH_3$ | Excellent | Yes | Yes |
| Triacetylmethane | $H_3C-\overset{O}{\overset{\|}{C}}-\underset{O=\overset{\|}{C}-CH_3}{\overset{\|}{CH}}-\overset{O}{\overset{\|}{C}}-CH_3$ | Good | — | — |
| 3,3-Dimethyl-2,4-Pentanedione | $CH_3-\overset{O}{\overset{\|}{C}}-\underset{CH_3}{\overset{CH_3}{\overset{\|}{\underset{\|}{C}}}}-\overset{O}{\overset{\|}{C}}-CH_3$ | None | — | — |
| 3-Methyl-2,4-Pentanedione | $CH_3-\overset{O}{\overset{\|}{C}}-\underset{CH_3}{\overset{\|}{CH}}-\overset{O}{\overset{\|}{C}}-CH_3$ | None | — | — |
| 5,5-Dimethyl-2,4-Hexanedione | $CH_3-\overset{O}{\overset{\|}{C}}-CH_2-\overset{O}{\overset{\|}{C}}-\underset{CH_3}{\overset{CH_3}{\overset{\|}{\underset{\|}{C}}}}-CH_3$ | Excellent | Yes | No |
| 7-Methyl-2,4-Octanedione | $CH_3-\overset{O}{\overset{\|}{C}}-CH_2-\overset{O}{\overset{\|}{C}}-CH_2-CH_2-\overset{CH_3}{\overset{\|}{CH}}-CH_3$ | Excellent | Yes | — |
| 2,4-Octanedione | $CH_3-\overset{O}{\overset{\|}{C}}-CH_2-\overset{O}{\overset{\|}{C}}-CH_2-CH_2-CH_2-CH_3$ | Excellent | Yes | — |

TABLE 1-continued

SCREENING OF DIKETONES FOR MMT CO-ANTIKNOCK ACTIVITY

| DIKETONE | MOLECULAR STRUCTURE | EFFECTIVENESS WITH MMT | REACTS WITH WET RUSTED STEEL | REACTS WITH TERNEPLATE |
|---|---|---|---|---|
| Benzoylacetone | C6H5—C(=O)—CH2—C(=O)—CH3 | Excellent | No[b] | No |
| p-Methylbenzoylacetone | CH3—C6H4—C(=O)—CH2—C(=O)—CH3 | Excellent | No | No |
| Dibenzoylmethane | C6H5—C(=O)—CH2—C(=O)—C6H5 | Good | — | — |
| 2-Acetylcyclohexanone | cyclohexanone-2-C(=O)—CH3 | Mild | — | — |
| 2-Acetyl-1-Tetralone | tetralone-2-C(=O)—CH3 | Mild | — | — |

[a] In long term tests.
[b] Slightly reactive in long-term tests. Can be inhibited with dicyclohexyl ammonium nitrite or diisopropanolamine.

EXAMPLE II

Along with the additive screening program, a more extensive investigation was conducted with acetylacetone (AcAc) since it is one of the best MMT co-antiknocks and probably the least expensive. Although most of this work with AcAc was completed before it was found that a serious side-effect problem precludes the commercial use of AcAc, it is thought that the results reported here would be representative of β-diketone co-antiknocks such as benzoylacetone and methyl benzoylacetone, which do not have side-effect problems.

In FIG. 1, it is seen that the addition of up to 0.4% v acetylacetone to a commercial unleaded gasoline gasoline has no effect on the Research octane number (RON); however, this same fuel with MMT (at 0.062 or 0.1 g Mn/gal) has a substantial response to AcAc, with the octane number increasing rapidly with AcAc concentrations below 0.1% v. With 0.062 g Mn/gal, the optimum concentration appears to be about 0.2% v, although the response curve is fairly flat between about 0.15 and 0.3% v. At higher concentrations, the response appears to decrease slowly from the optimum. With the base fuel containing 0.1 g Mn/gal, the response with AcAc concentration is more gradual.

It appears that the optimum concentration of AcAc increases with the manganese content of the fuel (from 0.2% v AcAc with 0.062 g Mn/gal to about 0.4% v with 0.1 g Mn/gal). The Motor octane number (MON) response trend appears to be similar to that of the RON, but the response is only about half as great.

EXAMPLE III

Several tests were conducted to determine the Research and Motor octane number response of an unleaded gasoline (Blend B, Table III) to MMT alone and to a combination of MMT and AcAc. Various concentrations of MMT and AcAc were added to the gasoline as indicated in FIG. 2.

FIG. 2 shows the effect of a constant mole ratio (20/1) of AcAc and MMT on the RON and MON of a fully formulated gasoline. The results indicate that as more MMT is used in the fuel, more AcAc is needed to give a fixed (say 0.5% octane number enhancement. From a practical and economic standpoint, this means that the use of an MMT co-antiknock becomes more viable and desirable as the MMT content of the fuel is lowered. Note that 0.05% (500 ppm) AcAc increases the RON of the fuel containing 0.05 g Mn/gal by the same amount (0.5 O.N.) as an additional 0.05 g Mn/gal; that is, the use of a co-antiknock with MMT would almost regain the octane loss encountered if the Mn level were lowered from ⅛ g to 1/16 g/gal.

EXAMPLE IV

Although compounds may show antiknock or co-antiknock activity in the Research and Motor Method knock engines, such octane enhancements are not necessarily observed in road octane ratings. For example, the co-antiknock response of AcAc in leaded (with TEL) gasolines was not found in vehicle road ratings in previous studies. Hence, it was of considerable interest to determine whether the co-antiknock response of AcAc with MMT manifested itself in higher road octane ratings of the fuel.

Modified Uniontown-type ratings were conducted in two 1976-model cars—a Chevrolet Chevelle with a 350 CID-2V V-8 engine and a Ford Granada with a 351 CED-2V V-8 engine, both with automatic transmissions. The road octane ratings of the base fuel and the base fuel with MMT and various levels of AcAc were determined while operating the vehicles on road simulation dynamometers. The Modified Uniontown-type knock ratings were determined during maximum-without-downshift accelerations in third gear from 30 to 60 mph (approximately 2000 to 2800 engine rpm) with the air conditioner off.

As shown in Table II, the co-antiknock enhancements with AcAc were also observed in road octane ratings. In general, the road response appears to be somewhat better than the Motor octane enhancement. Of particular interest is the observation that 0.05% v (500 ppm) AcAc increased the road octane number by 0.5 when added to the fuel containing only 0.05 g Mn/gal as MMT.

The properties of gasoline blends used in these tests are given in Table III.

TABLE II

ROAD RESPONSE OF MMT/AcAc IN UNLEADED GASOLINE

Fuel: Commercial Unleaded Base Gasoline (Blend B-Table III)
Cars: 1976 Ford Granada with a 351M-2V engine
1796 Chevrolet Chevelle with a 350-2V engine
Rating: Modified Uniontown-type

| Additives | | | | | |
|---|---|---|---|---|---|
| MMT, g Mn/gal | AcAc % v | Δ O.N. Research | Δ O.N. Motor | Δ Road O.N. 1976 Ford | Δ Road O.N. 1976 Chev |
| 0 | 0 | — | — | — | — |
| 0.05 | 0 | 1.2[b] | 0.8[b] | 0.5[b] | — |
| 0.05 | 0.05 | 0.5[a] | 0.3[a] | 0.5[a] | — |
| 0.1 | 0 | 1.8[b] | 1.2[b] | 1.5[b] | 0.8[b] |
| 0.1 | 0.05 | 0.3[a] | 0[a] | −0.1[a] | 0.1[a] |
| 0.1 | 0.1 | 0.6[a] | 0.2[a] | 0.2[a] | 0.2[a] |
| 0.1 | 0.2 | 0.9[a] | 0.6[a] | 0.6[a] | 0.4[a] |

[a]Relative to base fule containing same amount of MMT.
[b]Relative to base fuel (without MMT).

TABLE III

| FUEL PROPERTIES | | | | |
|---|---|---|---|---|
| UNLEADED GASOLINE BLEND | | | | |
| | A | B | C | D |
| Gravity, °API | 52.3 | 52.8 | 51.4 | 55.6 |
| RVP, lb | 9.3 | 3.0 | 7.2 | 9.2 |
| Research Oct. No. | 93.9 | 94.6 | 94.2 | 95.8 |
| Motor Octane No. | 84.6 | 84.8 | 84.0 | 85.6 |
| Sensitivity | 9.3 | 9.8 | 10.2 | 10.2 |
| ((R + M)/2 | 89.2 | 89.8 | 89.1 | 90.7 |
| ASTM D86 Distillation, °F. | | | | |
| IBP | 78 | 98 | 114 | 84 |
| 5% Evaporated | — | 120 | 131 | 116 |
| 10% v Evaporated | 120 | 134 | 146 | 125 |
| 20% v Evaporated | 154 | 156 | 166 | 147 |
| 30% v Evaporated | 188 | 181 | 191 | 170 |
| 40% v Evaporated | 212 | 209 | 217 | 200 |
| 50% v Evaporated | 228 | 231 | 236 | 229 |
| 60% v Evaporated | 242 | 246 | 249 | 246 |
| 70% v Evaporated | 258 | 262 | 267 | 261 |
| 80% v Evaporated | 279 | 284 | 292 | 282 |
| 90% v Evaporated | 308 | 326 | 336 | 333 |
| 95% v Evaporated | — | 361 | 370 | 361 |
| E.P. | 375 | 400 | 400 | 396 |
| Recovered, % v | 96.8 | 97.6 | 96.0 | 96.0 |
| Residue, % v | 1.4 | 1.3 | 1.5 | 1.0 |
| Loss, % v | 1.8 | 0.9 | 2.5 | 3.0 |
| Hydrocarbon Type by FIA, % v | | | | |
| Saturates | 56.0 | 53.5 | 56.0 | 63.4 |
| Olefins | 2.0 | 3.5 | 2.1 | 0.6 |
| Aromatics | 42.0 | 43.0 | 41.9 | 36.0 |
| Sulfur, % w - Total - | 0.002 | 0.006 | 0.003 | 0.0027 |
| Mercaptan | — | 0.0004 | 0.0003 | 0.0005 |

EXAMPLE V

An investigation was undertaken to determine the compatibility of AcAc with gasoline distribution and vehicle fuel system by conducting car tests. Accordingly, a blend of unleaded gasoline with 0.1 g Mn/gal as MMT and 0.1% v AcAc was stored in a 1000-gallon tank for fueling test cars via a conventional service station gasoline dispenser. Although the gasoline in the epoxy-lined tank was clear, the fuel at the gasoline dispenser has a distinct red color. Laboratory test indicated that AcAc had reacted with wet rust (apparently ferric hydroxide) in the several hundred feet of steel pipe between the storage tank and dispenser, forming iron acetylacetonate which is soluble in gasoline and provides the red color.[a] Octane ratings of the colored gasoline indicated that most of the co-antiknock activity had been lost because of this reaction. Analysis of the gasoline for AcAc by a polarographic technique confirmed that most of the AcAc had indeed reacted.

(a) Additional tests showed that fuel containing AcAc did not react with dry rusted steel specimens or with $Fe_2O_3$ powder. These findings suggest that AcAc reacts with iron hydroxide rather than iron oxide to form the acetylacetonate.

EXAMPLE VI

To investigate the possible use of additives to prevent the reaction of AcAc with rust, tests were conducted in which "wet" rusted steel coupons were stored in samples of gasoline containing MMT (0.1 g Mn/gal), AcAc (0.1% v) and the candidate inhibitor additive for five days, after which the gasoline samples were analyzed for iron by X-ray scan and for AcAc by polarography. Eight hydrocarbon-soluble additives—Nalco 5403 corrosion inhibitor, DuPont metal deactivator,[b] triethyamine, acetonitrile and four fluoro-surfactants—were found to be ineffective in preventing the reaction of AcAc with rust. The following seven water-soluble corrosion inhibitors were also evaluated: citric acid, tannic acid, oxalic acid, caustic, Halliburton MSA inhibitor, 33% sodium benzoate/67% sodium nitrite, and ethylenediamine tetraacetic acid. Of these water-soluble compounds, only the sodium benzoate/sodium nitrite solution was completely effective in inhibiting the reaction of AcAc with rust. Unfortunately, water-soluble corrosion inhibitors, cannot be used in produce pipelines because of cross-contamination problems, e.g., causing turbine fuel to fail specification at the terminal.
(b) N,N' disalicylidine-1,2-propanediamine.

EXAMPLE VII

Four β-diketones—benzoylacetone, 3,5-heptanedione, 2,4-hexanedione and 2,2,6,6-tetramethyl-3,5-heptanedione (TMHD)—which are as effective co-antiknocks as AcAc, were investigated along with AcAc for their corrosivity in gasline toward some metals present in fuel handling systems. Specimens of steel, rusted steel (both dry and wet), aluminum and terneplate, which are metals of primary interest, were stored individually in gasolines containing the β-diketones at 0.1% v. After 12 days, the gasoline samples were analyzed for the respective metals by X-ray scan and/or atomic absorption and for the β-diketones by polarography. The results showed that AcAc and 2,4-hexanedione reacted with wet rusted steel, while TMHD reacted only with terneplate. The benzoylacetone and 3,5-heptanedione, however, did not react with any of the specimens in this brief test.

These results indicate that there are some β-diketone co-antiknocks, such as benzoylacetone and 3,5-heptanedione, which are fairly innocuous towards fuel handling systems. Further, as shown in FIG. 3, benzoylacetone is quite effective in increasing the Research octane number of commercial unleaded gasoline containing MMT—analysis showed that it contained 0.06 g Mn/gal; specifications at the time limited the maximum Mn content to 0.0625 g/gal. Note that 600 ppm benzoylacetone increased the RON by 0.5 number, with a maximum enhancement of 0.8 number at about 1500 ppm (0.15%). Although the octane boost from the 0.06 g Mn/gal in this fuel is not known, experience shows that this amount of MMT typically increases RON by 0.8 to 1.0 RON in this type of gasoline. Hence, a small amount of benzoylacetone as a co-antiknock can increase the antiknock activity of MMT by up to nearly 100%.

EXAMPLE VIII

Nine β-diketones which can be made most easily from commercially available chemicals (5,5-dimethyl-2,4-hexanedione, 2,4-heptanedione, 7-methyl-2,4-octanedione, 2,4-octanedione, 2,4-nonanedione, 2,4-hexanedione, p-methyl benzoylacetone, 6-methyl-2,4-heptanedione and benzoylacetone were evaluated for co-antiknock activity and for reactivity with wet-rusted steel and terneplate (interior surface coating of vehicle fuel tanks). The results of these tests are shown in Table I. As expected, all these β-diketones were effective co-antiknocks in gasoline containing MMT; however, only two (benzoylacetone and p-methyl benzoylacetone) were unreactive towards the metals in initial tests. The seven which failed were aliphatic β-diketones, indicating that these as a class may be unacceptable as gasoline additives.

EXAMPLE IX

Long-term tests with benzoylacetone showed that it reacts slowly with wet-rusted steel (but not with terneplate). Accordingly, several corrosion inhibitors were tested to inhibit this reaction. These tests were conducted by adding from 100 to 200 ppm by weight of the corrosion inhibitors tested to the benzoylacetone and repeating the rust tests. Of sixteen additives tested, two hydrocarbon soluble additives—dicyclohexyl ammonium nitrite and diisopropanolamine—were very effective in inhibiting the benzoylacetone/rust reaction. Nalco 5403, a corrosion inhibitor approved for use in pipelines, was somewhat less effective (the severity of our tests relative to field conditions is unknown). Similar results can be expected with p-methyl benzoylacetone.

EXAMPLE X

A tabulation of octane ratings for two gasolines of comparable octane quality containing various amounts of selected diketone co-antiknock compounds is given in Table IV. Thest tests indicate that benzoylacetone and p-methyl benzoylacetoneare equally as effective co-antiknock compounds as acetylacetone.

TABLE IV

MMT CO-ANTIKNOCK ACTIVITY FOR SELECTED DIKETONES

| CO-ANTIKNOCK COMPOUND | | RATING FUEL | | DELTA OCTANE RATING | |
|---|---|---|---|---|---|
| Diketone | Conc. % v | Blend Ex. Table III | MMT g Mn/gal | Δ Research | Δ Motor |
| 2,4-Pent-anedione (acetylacetone) | 0.1 | B | 0.1 | 0.5 | 0.2 |
| | 0.2 | | | 0.9 | 0.6 |
| | 0.4 | | | 1.1 | 0.7 |
| Benzoyl-acetone | 0.1$^a$ | B | 0.1 | 0.5 | 0 |
| | 0.2$^a$ | | | 0.8 | 0.3 |
| | 0.5$^a$ | | | 1.1 | 0.7 |
| p-Methyl Benzoyl-acetone | 0.1 | C | 0.1 | 0.5 | 0.2 |
| | 0.2 | | | 0.7 | 0.5 |
| | 0.4 | | | 1.1 | 0.7 |

$^a$% wt.

Other embodiments of the invention will be apparent to those skilled in the art from a consideration of this specification or from practice of the invention disclosed herein. It is intended that the specification and examples be considered as exemplary only, with the true scope and spirit of the invention being indicated by the following claims.

What is claimed is:

1. An improved method of operating a spark ignition internal combustion engine which comprises burning in said engine an unleaded gasoline which has been transported to the engine through a gasoline distribution system which includes rusted steel lines and/or has been stored in an automobile fuel tank which includes a terneplate internal surface coating, said unleaded gasoline containing as a primary antiknock compound from about 0.005 to about 0.1 gram manganese per gallon as methylcyclopentadienyl manganese tricarbonyl (MMT) and containing as a co-antiknock compound which is unreactive with rusted steel or terneplate from 5 to about 60 moles of benzoylacetone or methyl benzoylacetone per mole of manganese and optionally a suitable corrosion inhibitor.

2. The method of claim 1, wherein the corrosion inhibitor is dicyclohexyl ammonium nitrite or diisopropanolamine.

3. The method of claim 1, wherein the gasoline contains from about 10 to about 30 moles of benzoylacetone or methyl benzoylacetone per mole of manganese.

4. The method of claim 1, wherein the co-antiknock compound is benzoylacetone and the gasoline contains from 10 to 200 ppm by weight dicyclohexyl ammonium nitrite or diisopropanolamine.

5. The method of claim 1, wherein the co-antiknock compound is p-methyl benzoylacetone.

* * * * *